(12) United States Patent
Ananthapadmanabh et al.

(10) Patent No.: US 10,587,725 B2
(45) Date of Patent: Mar. 10, 2020

(54) ENABLING A TRADITIONAL LANGUAGE PLATFORM TO PARTICIPATE IN A JAVA ENTERPRISE COMPUTING ENVIRONMENT

(71) Applicant: INTERNATIONAL BUSINESS MACHINES CORPORATION, Armonk, NY (US)

(72) Inventors: Madhu B. Ananthapadmanabh, Bangalore (IN); Anubhuti Kaushik, Dwarka (IN); Kishor S. Kulkarni, Gadag (IN)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 15/464,489

(22) Filed: Mar. 21, 2017

(65) Prior Publication Data

US 2018/0278544 A1 Sep. 27, 2018

(51) Int. Cl.
*H04L 12/927* (2013.01)
*H04L 29/08* (2006.01)

(52) U.S. Cl.
CPC ............ *H04L 67/327* (2013.01); *H04L 67/02* (2013.01); *H04L 67/10* (2013.01); *H04L 67/1002* (2013.01); *H04L 67/2895* (2013.01)

(58) Field of Classification Search
CPC .......... G06F 9/461; G06F 16/954; G06F 7/00; G06F 17/30; H04L 67/10; H04L 2463/102
See application file for complete search history.

(56) References Cited

U.S. PATENT DOCUMENTS

| | | | |
|---|---|---|---|
| 7,444,536 B1* | 10/2008 | Jairath | G06F 9/465 714/4.11 |
| 8,069,435 B1 | 11/2011 | Lai | |
| 2005/0104858 A1* | 5/2005 | Need | G06F 9/451 345/172 |
| 2005/0262477 A1 | 11/2005 | Kovachka-Dimitrova et al. | |
| 2005/0273783 A1* | 12/2005 | Tankov | G06F 9/461 718/100 |
| 2008/0126474 A1* | 5/2008 | Beisiegel | G06F 9/4488 709/203 |
| 2008/0244613 A1* | 10/2008 | Parthasarathy | G06F 9/546 719/313 |
| 2014/0019628 A1* | 1/2014 | Shankar | G06F 9/541 709/228 |
| 2014/0033205 A1 | 1/2014 | Kashyap et al. | |
| 2016/0219093 A1* | 7/2016 | Gangadharan | H04L 65/1006 |
| 2018/0011912 A1* | 1/2018 | Ul Karimi | G06F 21/64 |

* cited by examiner

*Primary Examiner* — Chirag R Patel
(74) *Attorney, Agent, or Firm* — Schmeiser, Olsen & Watts; William H. Hartwell

(57) ABSTRACT

A method, system and computer program is provided for enabling varying computer applications that are running in Enterprise Information System to send request to a cluster of Java Enterprise Server (J2EE server) cluster. One or more computers provide an application server environment including one or more servers operating within the application server environment to run an application. The computers create a cluster of resource adapters and create a cluster thread for each of the resource adapters to read a cluster port from configured properties, wherein the cluster thread for each of the resource adapters enables an enterprise information system to participate in a cluster of J2EE runtime servers.

20 Claims, 14 Drawing Sheets

ENABLING A TRADITIONAL LANGUAGE PLATFORM TO PARTICIPATE IN A JAVA ENTERPRISE COMPUTING ENVIRONMENT

FIELD OF THE INVENTION

The present invention relates generally to application servers, and more particularly to enabling varying computer applications to function in a Java enterprise computing environment.

BACKGROUND OF THE INVENTION

An application server provides software applications with services such as security, data services, transaction support, load balancing and management of large distributed systems. One type of application server is the Java EE application server used to support the Java Platform, Enterprise Edition (Java EE). The Java EE application server can handle transactions, security, scalability, concurrency and management of the components that are deployed to the server in order to enable developers to concentrate more on the business logic of the components rather than on infrastructure and integration tasks.

Customers using legacy applications, such as Common Business-Oriented Language (COBOL), may desire to re-host such applications within a Java EE application server based upon the Java Virtual Machine (JVM) environment, where new developments are currently occurring, propel the adaptation of new technologies by legacy applications by leveraging the features provided in the modern Java EE application server environment.

In some implementations, there may be several hybrid application servers that are combined to form a "cluster." Requests to these clusters may be routed through routing agents, such as a reverse proxy server (e.g., Hypertext Transfer Protocol (HTTP) proxy server). A proxy server is a specific type of application server that acts as an intermediary for requests from clients seeking resources. One type of proxy server is a HTTP proxy server that routes HTTP requests to applications within the cluster of hybrid application servers that perform the work.

In such an implementation, the routing agent redirects the incoming requests to various hybrid application servers within the cluster based on a chosen routing algorithm. If a request is received by a Java EE application (within the Java EE container of the hybrid application server) that makes a call to a non-Java application (within the non-Java container of the hybrid application server), then the request will be serviced by the non-Java application.

Currently, the routing agent, such as a proxy server, only has knowledge of the availability of the Java EE applications to service the requests by monitoring the JVMs and sending only those requests to the Java EE applications running on a JVM that is operating. Once the JVM becomes nonoperational, the JVM will be marked as unavailable by the proxy server.

If, however, the non Java container (For example CICS as an Enterprise Information System—EIS) wants to route the requests to Java container based cluster then the container would be a one to one connection between non-Java container (EIS) to Java container. So the one to one connection will bring the difficulty in clustered environment where every non-Java container should be configured with the communication information of every other Java containers which are present in the cluster. This will cause the difficulties in serviceability, scalability and high availability.

SUMMARY OF THE INVENTION

A method is provided for enabling varying computer applications that are running in Enterprise Information System to send request to a cluster of Java Enterprise Servers (J2EE servers). One or more computers provide an application server environment including a cluster of one or more servers operating within the application server environment. The computers create a cluster of resource adapters and creating a cluster thread for each of the resource adapters to read a cluster port from configured properties.

The method may further comprise the step of binding, by the computers, at least one cluster thread of the resource adapters to a cluster port to define a main cluster engine, wherein the resource adapter having said at least one cluster thread communicates on custom protocol.

The EIS will then fetch the cluster engine for the information about the clusters and then establishes a one-to-one connection to each Java Enterprise servers (J2EE server) with workload monitoring facility.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, system and computer program product to enable a traditional language online transaction processing (OLTP) platform to participate in a JAVA EE cluster. While the following discusses the present invention in connection where a COBOL application invokes a J2EE application using an inbound resource adapter, the principles of the present invention propose a solution for an Enterprise Information System (EIS) to effectively participate in a cluster of J2EE runtime servers, etc. A person of ordinary skill in the art would be capable of applying the principles of the present invention to multiple implementations. Further, embodiments applying the principles of the present invention to various implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Heterogeneous deployment topologies are very common in large enterprises. The topologies typically have an OLTP platform such as TXSeries to host their business logic written in C and COBOL. The topologies will also have a Java EE runtime to host some part of their business and presentation logic. These two runtime environments are loosely coupled. As enterprises go through digital transformation, there is a need to modernize their application landscape. As the traditional language skills are diminishing, the need to extend the logic using modern and popular languages such as Java becomes obvious. When one extends the business logic in Java and hosts such logic on a Java EE environment, one needs to provide a tight coupling that maintains transactional context across the two runtimes.

Figure 1:
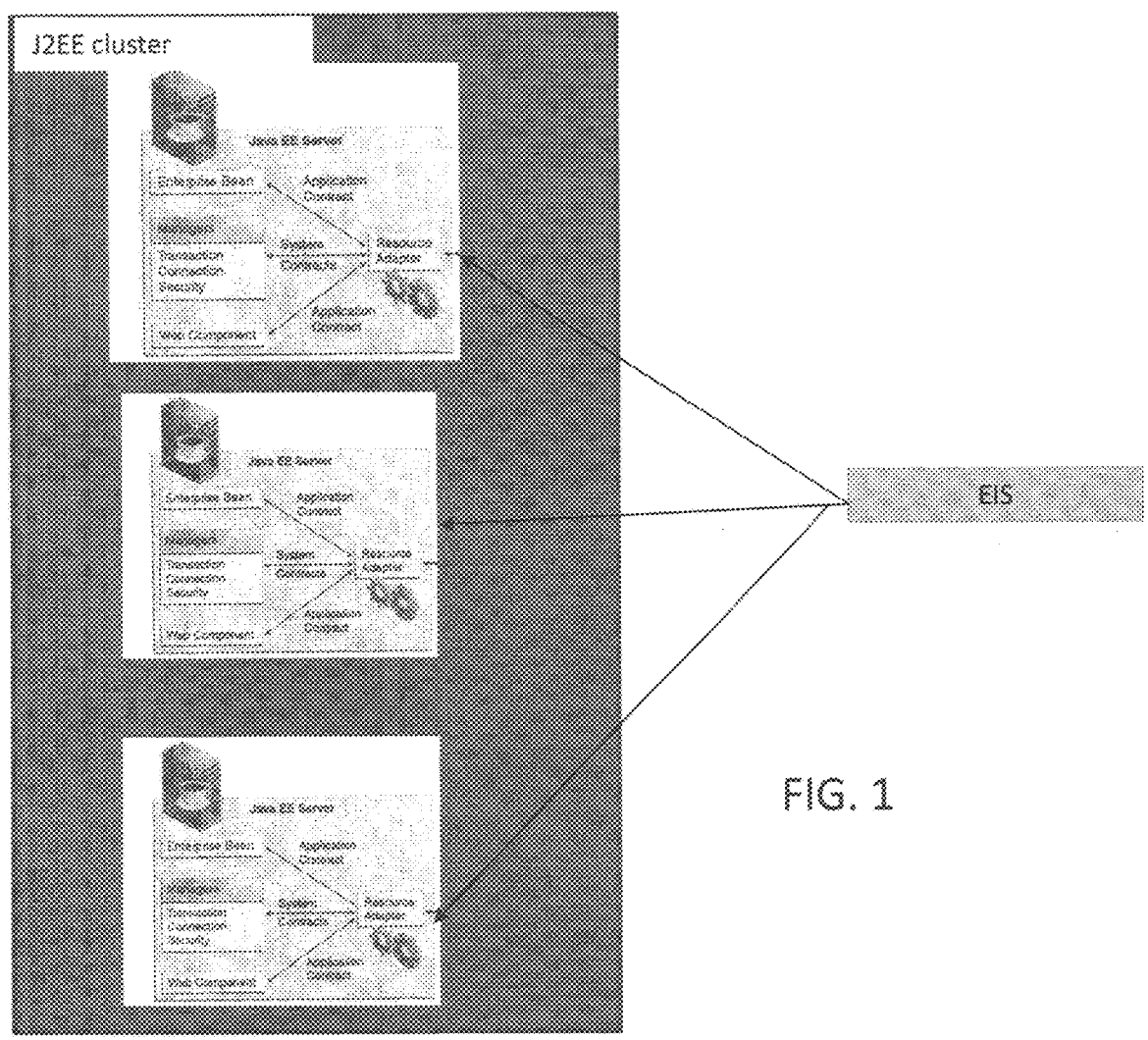
FIG. 1 illustrates a schematic of how the resource adapters facilitate communication between a Java EE cluster and an EIS.

FIG. 1 illustrates a schematic of how the resource adapter facilitates communication between a Java EE cluster and an EIS. A resource adapter is a Java EE component that implements the Java EE Connector architecture for a specific EIS. Examples of EISs include enterprise resource planning, mainframe transaction processing, and database systems. In a Java EE server, the Java Message Server and JavaMail also act as EISs that one may access using resource adapters. As illustrated in FIG. 1, if an EIS wants to connect to a resource adapter, the EIS is transparent to the knowledge of J2EE cluster to which the relevant resource adapter. The EIS will have to acquire the individual identity of each resource adapter running in the cluster. In that sense, the EIS cannot make use of the clustering aspects provided by the J2EE cluster. In this case, each resource adapter should be configured on a different port; the EIS should be configured with knowledge of each resource adapter. Additionally, the EIS cannot workload manage the different resource adapters to which the EIS is configured. If a new J2EE server is added to the cluster, the EIS cannot dynamically take advantage of new J2EE server. Likewise, if a J2EE server goes down, the EIS will not be able to dynamically handle the fault. The present invention provides a solution to this problem.

A resource adapter is analogous to a JDBC driver. Both provide a standard API through which an application can access a resource that is outside the Java EE server. For a resource adapter, the target system is an EIS; for a JDBC driver, the target system is a DBMS. Resource adapters and JDBC drivers are rarely created by application developers. In most cases, both types of software are built by vendors that sell tools, servers, or integration software.

The resource adapter mediates communication between the Java EE server and the EIS by means of contracts. The application contract defines the API through which a Java EE component, such as an enterprise bean, accesses the EIS. This API is the only view that the component has of the EIS. The system contracts link the resource adapter to important services that are managed by the Java EE server. The resource adapter itself and the resource adapter system contracts are transparent to the Java EE component.

The legacy application typically co-ordinates the transaction and passes a XA context to the J2EE runtime. Further, the J2EE application should run under the same execution context. This application is facilitated by the Inbound Resource Adapters deployed in J2EE servers. This sort of heterogeneous integration poses a challenge when the clustering in enabled in the J2EE runtime environment. In a scenario where COBOL Application invokes a Java Application via an inbound resource adapter running in J2EE application runtime, the EIS cannot take the advantage of the clustering in J2EE environments. Because the inbound resource adapter has no knowledge of J2EE clusters, the customer has to not only configure the cluster as individual servers to each EIS, but is also unable to leverage the workload management and fail-over capabilities provided by the cluster for any incoming request from an EIS.

Figure 2:
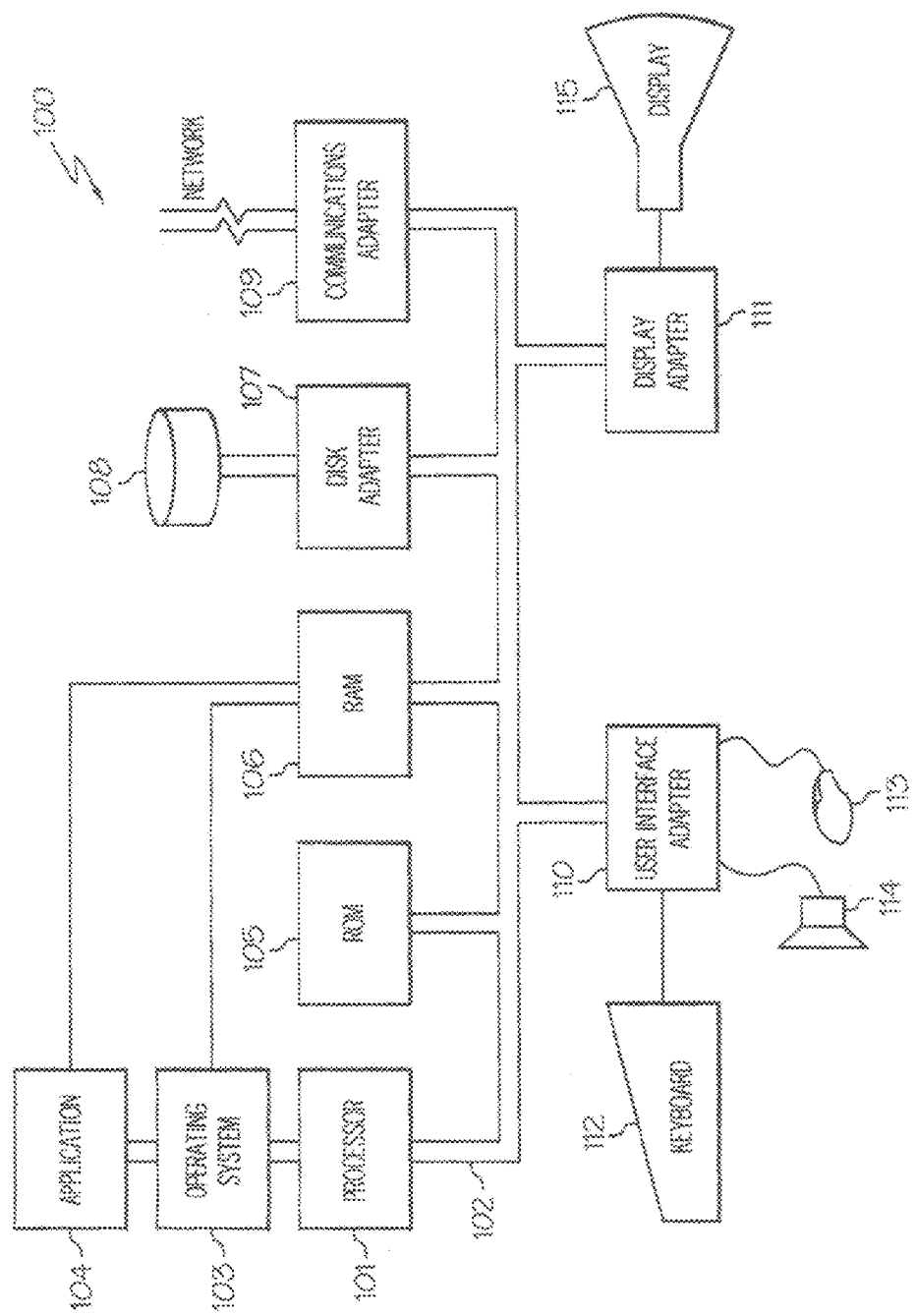
FIG. 2 illustrates a hardware configuration of a computer system which is representative of a hardware environment according to an exemplary embodiment of the present invention.

FIG. 2 illustrates a hardware configuration of a computer system 100 which is representative of a hardware environment according to an exemplary embodiment of the present invention. Computer system 100 has a processor 101 coupled to various other components by system bus 102. An operating system 103 runs on processor 101 and provides control and coordinates the functions of the various components of FIG. 1. An application 104 in accordance with the principles of the present invention runs in conjunction with operating system 103 and provides calls to operating system 103 where the calls implement the various functions or services to be performed by application 104. Application 104 may include, for example, a program for handling non-Java container failures in a cluster of hybrid application servers.

Referring again to FIG. 2, read-only memory ("ROM") 105 is coupled to system bus 102 and includes a basic input/output system ("BIOS") that controls certain basic functions of computer system 100. Random access memory ("RAM") 106 and disk adapter 107 are also coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive.

Computer system 100 may further include a communications adapter 109 coupled to bus 102. Communications adapter 109 interconnects bus 102 with an outside network thereby enabling computer system 100 to communicate with other such systems.

I/O devices may also be connected to computer system 100 via a user interface adapter 110 and a display adapter 111. Keyboard 112, mouse 113 and speaker 114 may all be interconnected to bus 102 through user interface adapter 110. A display monitor 115 may be connected to system bus 102 by display adapter 111. In this manner, a user is capable of inputting to computer system 100 through keyboard 112 or mouse 113 or receiving output from computer system 100 via display 115 or speaker 114.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," 'module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

Figure 3:
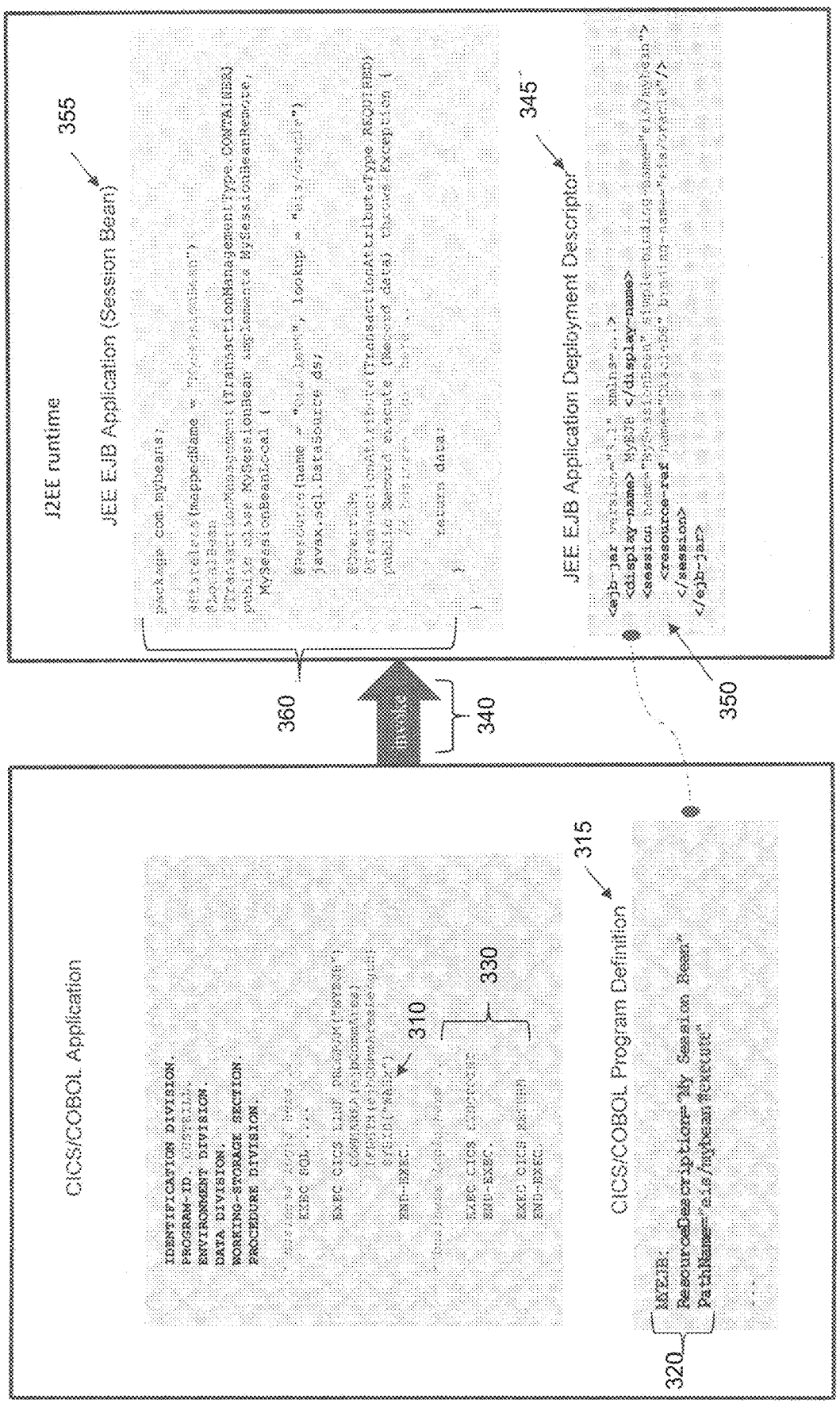
FIG. 3 illustrates a conventional typical scenario where a COBOL Application invokes a J2EE Application using an Inbound Resource Adapter.

FIG. 3 illustrates a conventional typical scenario where a COBOL Application invokes a J2EE Application using an Inbound Resource Adapter; i.e., a standard interface at 310 where the Connection Definition points to a J2EE connection. In FIG. 3, WASx is a connection definition pertaining to a J2EE runtime server. Under the program definition section 315, the EIS looks up the program definition 320 of the J2EE program and fetches the JNDI references which are defined in the J2EE server. At 310, the EIS looks up the connection definition of the J2EE server and fetches the IP address and port on which the resource adapter in the J2EE server is running. At 340, the EIS transfers the JNDI reference over the network to the resource adapter on the IP address and port from feature 330. At the Application Deployment Descriptor 345, the resource adapter looks up the JNDI reference in the J2EE server and fetches the J2EE application at 350. In the Session bean 355, the resource adapter requests the application server to run the J2EE application via features 360.

Figure 4:
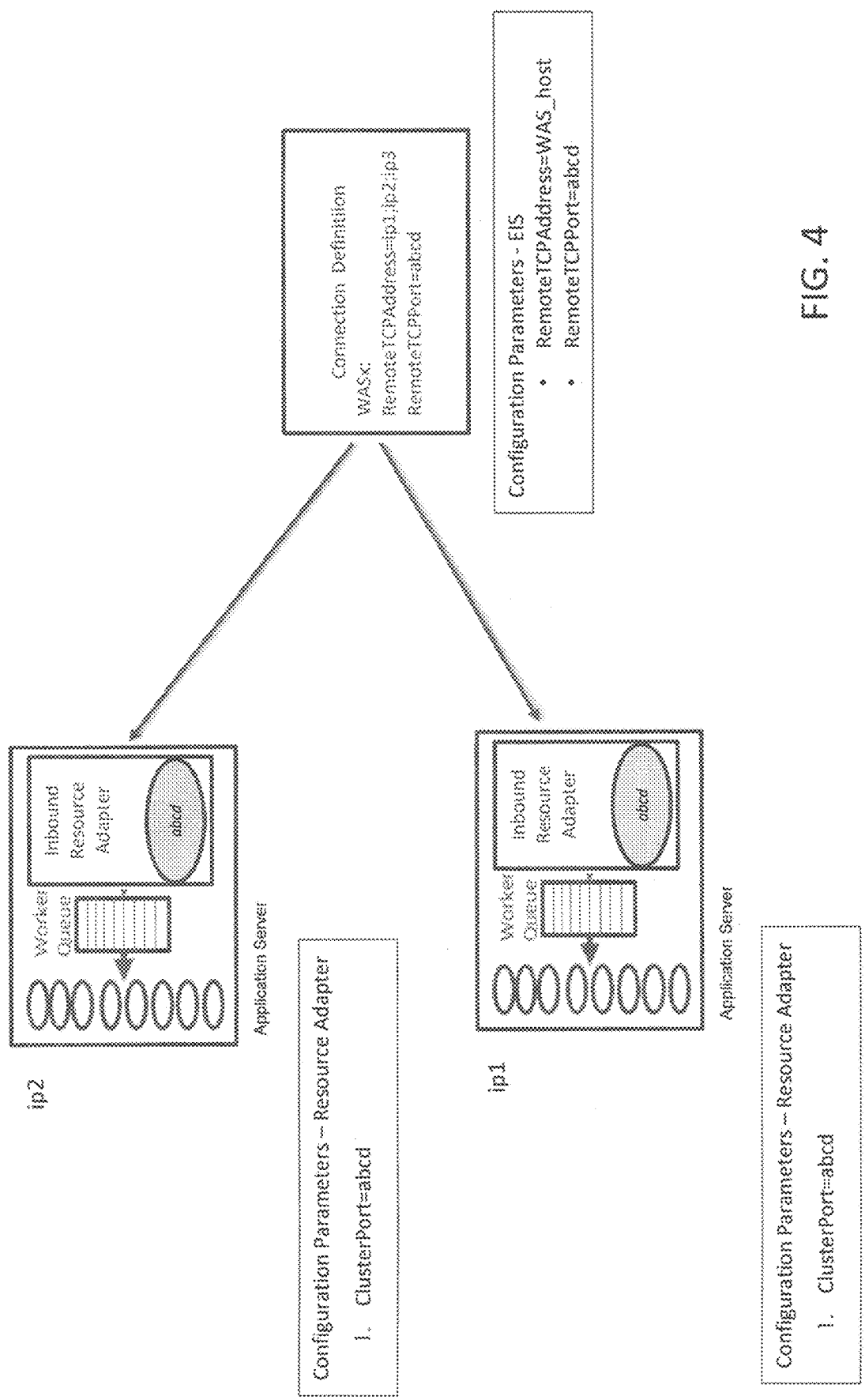
FIG. 4 illustrates an example of how the J2EE Server connection definition will be presented in the EIS according to an embodiment of the present invention.

FIG. 4 illustrates an example of how the J2EE Server connection definition will be presented in the EIS according to an embodiment of the present invention. While the arrangement of FIG. 4 works adequately in a single server environment, problems arise in a large scale enterprise where a customer is using large clusters of J2EE runtime. FIG. 4 illustrates a configuration in a clustered environment where such problems may typically occur. For example, problem arises when users want to employ an Inbound JCA Adapter in clustering but were unable to do so, because.

1. A cluster can be very large consisting of multiple cluster members and defining them individually to an EIS can be tedious and error prone.
2. Each EIS will have to be updated manually with any subsequent change in cluster configuration.
3. The application will have to implement a specific workload balancing algorithm to make use of a cluster.
4. No failover mechanism is provided by the cluster as the manual configuration defined in EIS is incapable of reflecting any dynamic updates in the cluster.

Presently, no approach exists that defines how an XA based EIS can participate in a clustered environment effectively with minimal configuration. The purpose of the present invention is to propose a solution for an EIS to effectively participate in a cluster of J2EE runtimes servers. The present invention provides a method that will allow the traditional language applications participate in a cluster consisting of J2EE application servers and also provide high availability (HA) and workload balancing capabilities with minimum configuration.

According to one embodiment, the invention proposes a method consisting of clusterThread within each cluster member. All the clusterThreads compete with each other to dynamically choose a cluster engine. All the resources adapters deployed on a cluster from there on should come up on ephemeral ports and publish the respective resource adapter port information as well as weight to the cluster engine. The EIS can query the cluster engine to get the information on which each resource adapter port is listening for inbound connections and their respective weights. This method is applicable to port based resource adapters. This method is generic and will work for any J2EE server. The EIS can use any algorithm to do the routing of requests.

Thus, the invention performs the following:
1. Creates a cluster of resource adapters with minimum external configuration.
2. Automatically discovers the cluster members by an EIS.
3. Maintains transactionality when cluster members come on ephemeral ports.
4. Dynamically detects the failure and availability of cluster members.

Figure 5:
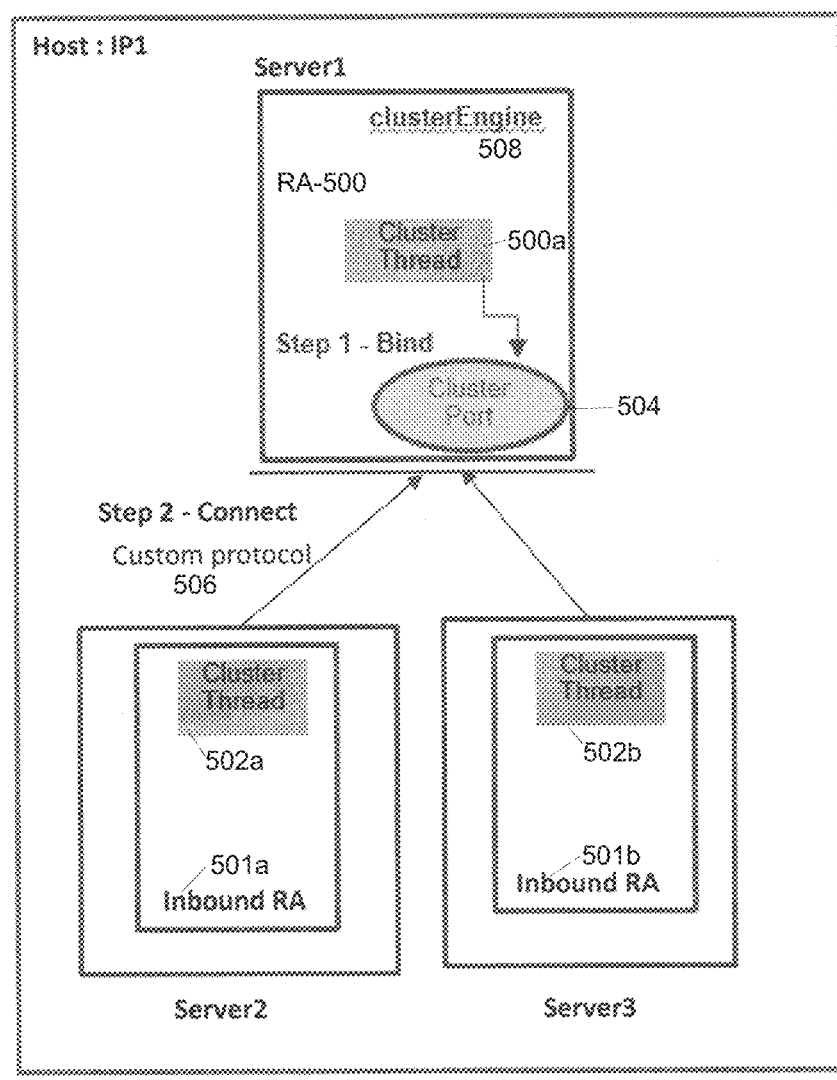
FIG. 5 illustrates a relationship between the cluster threads and cluster ports for three servers in accordance with one embodiment of the present invention.

FIG. 5 illustrates a relationship between the cluster threads and cluster ports for three servers in accordance with one embodiment of the present invention. The different steps involved are explained below.

Steps to be executed in Resource Adapter.
Step 1:
Resource Adapter 501*a*, 501*b* creates a clusterThread 502*a*, 502*b*.

All Resource adapters will create a new thread on a well-known endpoint specified in the configuration during resource adapter deployment. Thus, the resource adapter 501*a*, 501*b* will spawn a new clusterThread 502*a*, 502*b*, which be used to establish a cluster of resource adapters. The clusterThread will be created as the startup of the resource adapter using Java threads. All other initiations should happen after the cluster thread has been created. After the resource adapter has spawned the new cluster thread, the cluster thread will read the clusterPort 504 from configured properties in a J2EE Resource Adapter Custom Properties. All the resource adapters (RA) will have clusterThreads and each clusterThread will attempt to will bind on the clusterPort. At this point, a race condition will happen. Race condition is when multiple consumers try to use same resource and compete with each other to get the resource. Here, race condition happens because all the resource adapters will try to bind on the single well known port, but the operating system will allow only one cluster thread to bind to that well known port. Because of race condition only one RA will succeed and others will fail to bind. In accordance with the invention, the successful resource adapter 500 will become clusterEngine 508 for that physical box. The clusterThread 500*a* in this resource adapter 500 is now listening via the clusterPort 504 on custom protocol 506. One may define this resource adapter 500 the ClusterEngine 508. Because of race condition, only one "primary" RA 500 will succeed and the other resource adapters will fail to bind. The primary RA 500 will become a clusterEngine 508 for that physical box. Race condition occurs when two threads operate on the same object without synchronization and the respective operations interleave on each other. The clusterThread 500*a* in the primary resource adapter 500 or "cluster engine" 508 is now listening on clusterPort 504 on a custom protocol 506. For purposes of this invention, the primary resource adapter that binds to the clusterPort will be termed the cluster engine.

Step 2: Create 'Worker-clusterThreads' and Connect

Other resource adapters 501*a*, 501*b* that had failed to bind to clusterPort (the "secondary" RAs) will now connect to clusterPort 504. The clusterThreads 502*a*, 502*b* of all other "secondary" resource adapters are now connected to clusterEngine 508 over the custom protocol 506. This process will happen on each physical box. So, each physical box will have one cluster engine bound on the cluster port and other servers are connected to that cluster engine. The clusterThread will wait for a signal from regular inbound listener thread. One may define these as 'worker-clusterThreads'. The foregoing process will happen on each physical box. Thus, each physical box will have one clusterEngine bound on a clusterPort and worker-servers connected to that clusterEngine.

Figure 6:
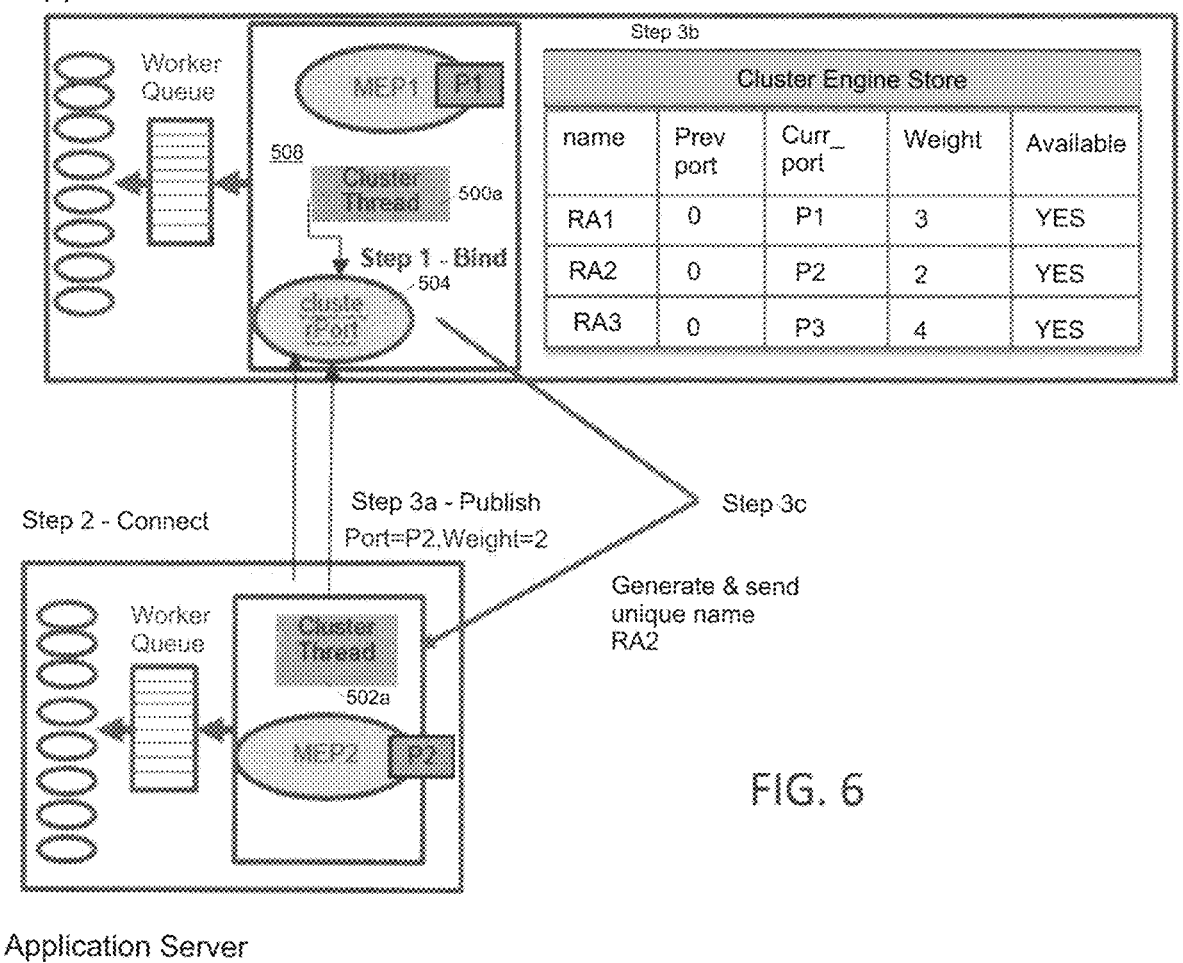
FIG. 6 illustrates an interaction of application servers interacting with inbound thread listeners on ephemeral ports to publish port information and create data stores according to an embodiment of the present invention.

FIG. 6 illustrates an interaction of application servers interacting with inbound thread listeners on ephemeral ports to publish port information and create data stores according to an embodiment of the present invention and as described below.

Step 3a: Resource Adapters Come Up at Ephemeral Ports.

As schematically illustrated by FIG. 6, all resource adapters will now spawn regular inbound listener threads on ephemeral ports. Ephemeral ports are provided by the operating system. The ephemeral ports are the set of free ports which can be used by any process. Once each resource adapter inbound listener thread (referred to in FIG. 6 as MEP) comes up, the listener thread(s) will signal the clusterThread 502*a* in a J2EE and publish this port information to the clusterEngine 508 (see Step 3a). The listener thread(s)

may also publish weight to the clusterEngine 508. Weight is an indication of how much work that J2EE server is capable of handling. Weight can be a custom property of a resource adapter, or weight can be derived using heap-size of that J2EE server. There can be various methods to determine weight according to techniques known to those of skill in the art.

Step 3b: clusterEngine Creates Cluster Engine Store.

As clusterEngine 508 gets information from all the 'worker-clusterThreads' 502a, the cluster engine 508 creates a datastore to store all this information at step 3b. One may define this as a cluster engine store (see FIG. 6). The cluster engine store should be stored on file system or in a datastore which is accessible be all the J2EE servers inside that cluster on that physical box, whereby the information is available for recovery in the event of crash of clusterEngine 508.

Step 3c: Generation of Unique Name for Each RA.

Next, the clusterEngine 508 will generate and send a unique name back to the resource adapters. The resource adapters will store the unique name in a local persistent place. Each resource adapter will save the unique name in a file local to the respective resource adapter. In case of crash, the resource adapters should come up using the same unique name. At this point, the cluster engine data store will be a file in local system. In accordance with this invention, the data store could be a database or any other data store. At the end of step 3, the clusterEngine will have the information of which resource adapters are listening on which respective ports. With the completion of the naming step, initialization is done as illustrated with respect to FIG. 6.

Figure 7:
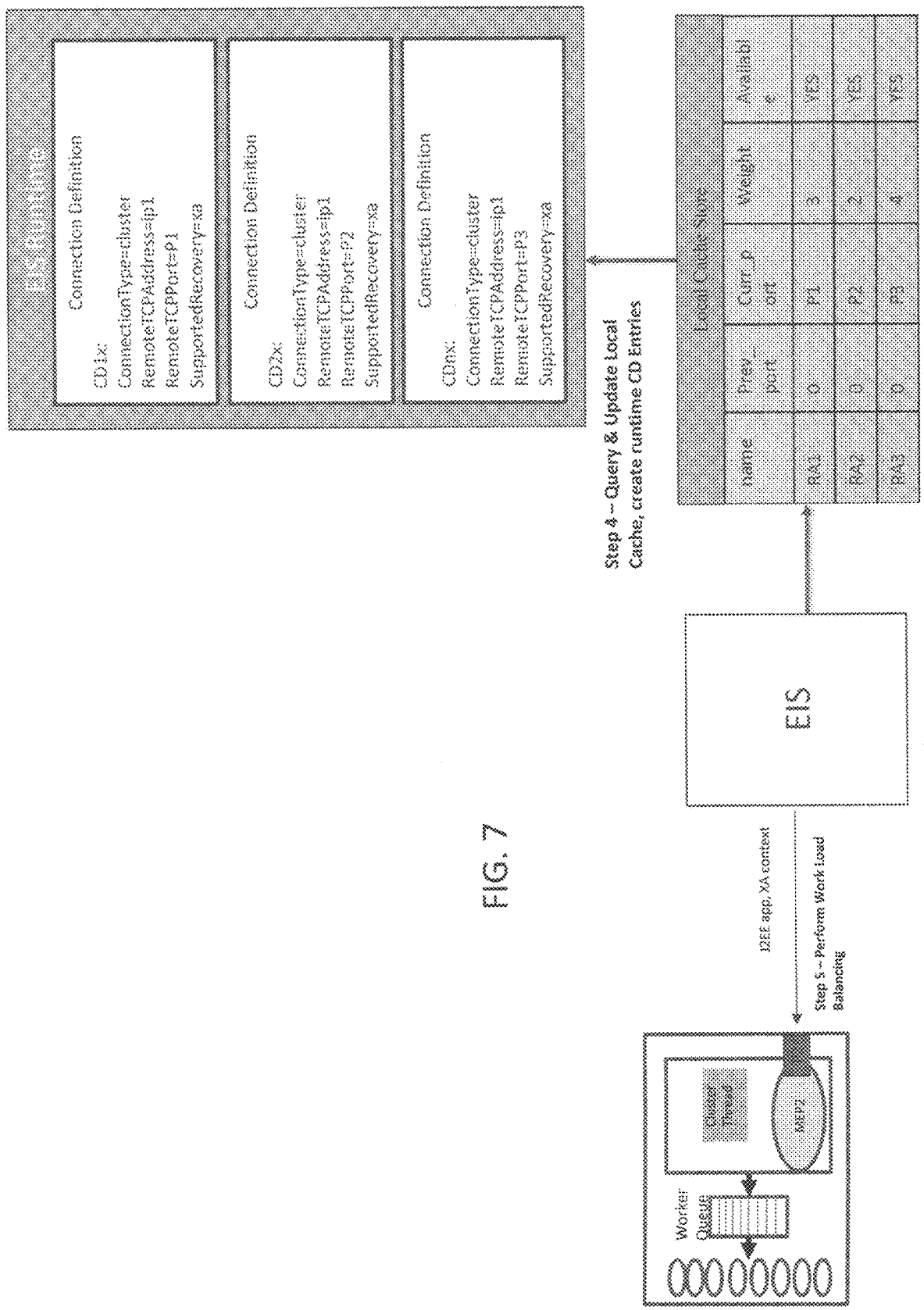
FIG. 7 illustrates schematically how the EIS creates a runtime list of connection definitions for individual J2EE servers according to an embodiment of the present invention.

FIG. 7 illustrates schematically how the EIS creates a runtime list of connection definitions for individual J2EE servers according to an embodiment of the present invention and as described below.

Step 4: EIS Will Query the Configuration of Cluster from Cluster Engine Store and Create Runtime Definitions of Connections The enterprise information system (EIS) queries the cluster engine on the well-known port; i.e., the cluster port. The EIS will query all of the cluster engines on IP Addresses where clusters are configured. The cluster thread will return a list of al resource adapters and their ports listening in on that machine. Thus, the EIS will have a dynamic list of IP addresses that are part of the cluster. The EIS will query the IP Address and clusterEngine that is bound on configured port to fetch the list of message endpoint ports. The EIS will repeat this process for all the IP addresses (or physical machines) where cluster members are configured. Each EIS now has a dynamic list of all the J2EE servers participating in a cluster. The EIS will create a runtime list of all the Connection Definitions (called CD Entries) for individual J2EE servers as illustrated by FIG. 7. The server(s) will store the output in a local cache and, at step 5, the EIS and server(s) will perform workload balancing as described below.

Figure 8:
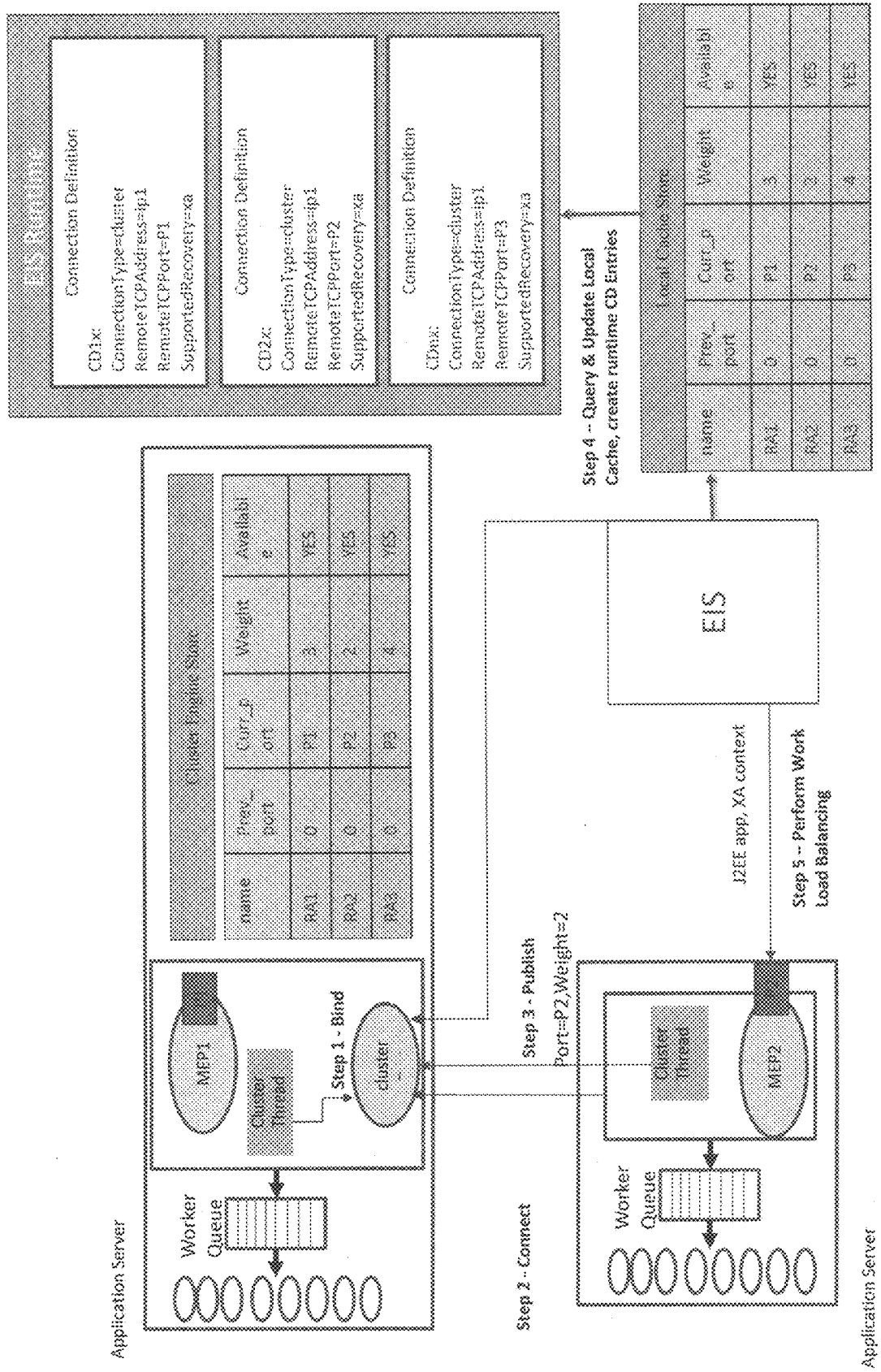
FIG. 8 illustrates schematically how the EIS will query regularly to update the EIS local Cache Store according to an embodiment of the present invention.

FIG. 8 illustrates schematically how the EIS will query regularly to update the EIS local Cache Store according to an embodiment of the present invention and as described below.

Step 5: EIS Will Perform Workload Balancing

On each J2EE program invocation, EIS will go through the list of runtime CD entries. Based on workload algorithm (likely round robin), the EIS will route the request to specific resource adapter. Once request has begun to a specific resource adapter, the request becomes a normal transaction to that resource adapter. Transactional context will be passed to that resource adapter, and the EIS will take care of sending the prepare, commit, etc. to that resource adapter only. In other words, once the EIS has the list of all J2EE servers and their ports on which inbound resource adapters are listening, the EIS can choose an algorithm using the weights associated with each resource adapter to perform the workload balancing. The EIS will pass the J2EE Program Name, Data, and XA Execution Context to the corresponding Application Server. The EIS will query regularly to update a local Cache Store in the manner illustrated in FIG. 8.

Figure 9:
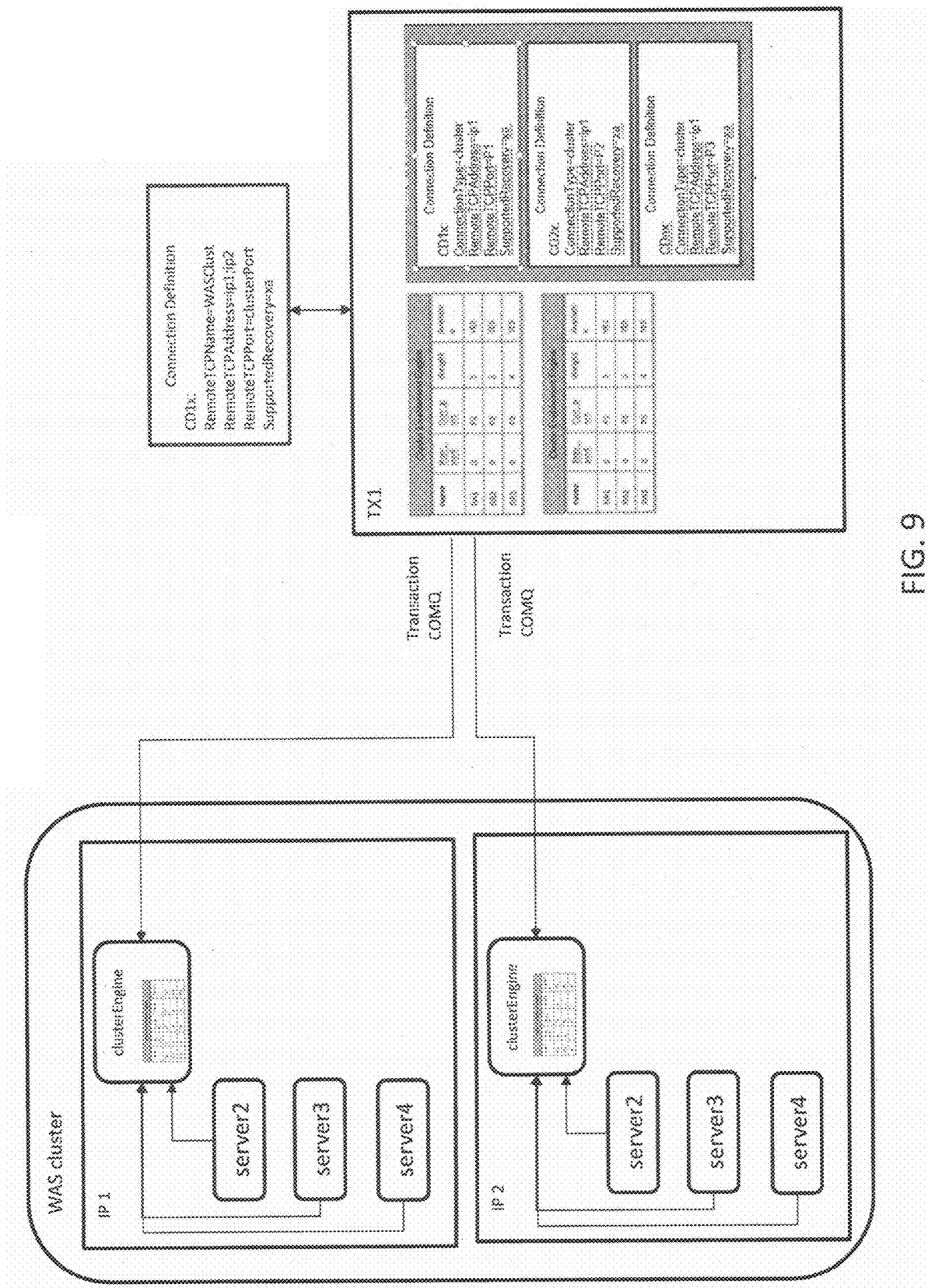
FIG. 9 illustrates a schematic representation of a cluster comprising multiple boxes with respective cluster engines interacting with an EIS according to an embodiment of the present invention.

FIG. 9 illustrates a schematic representation of a cluster comprising multiple boxes with respective cluster engines interacting with an EIS according to an embodiment of the present invention. The WAS cluster includes multiple physical boxes; e.g., IP1 and IP2, wherein each physical box will have a respective cluster engine. The EIS will connect to the cluster engine on each box to get the resource adapter listening on the physical box. Then, the EIS will connect to all of the servers using the information sent by the cluster engine. All of the servers will be connected to the cluster engine and send regular heartbeats to inform the system about the status.

Figure 10:
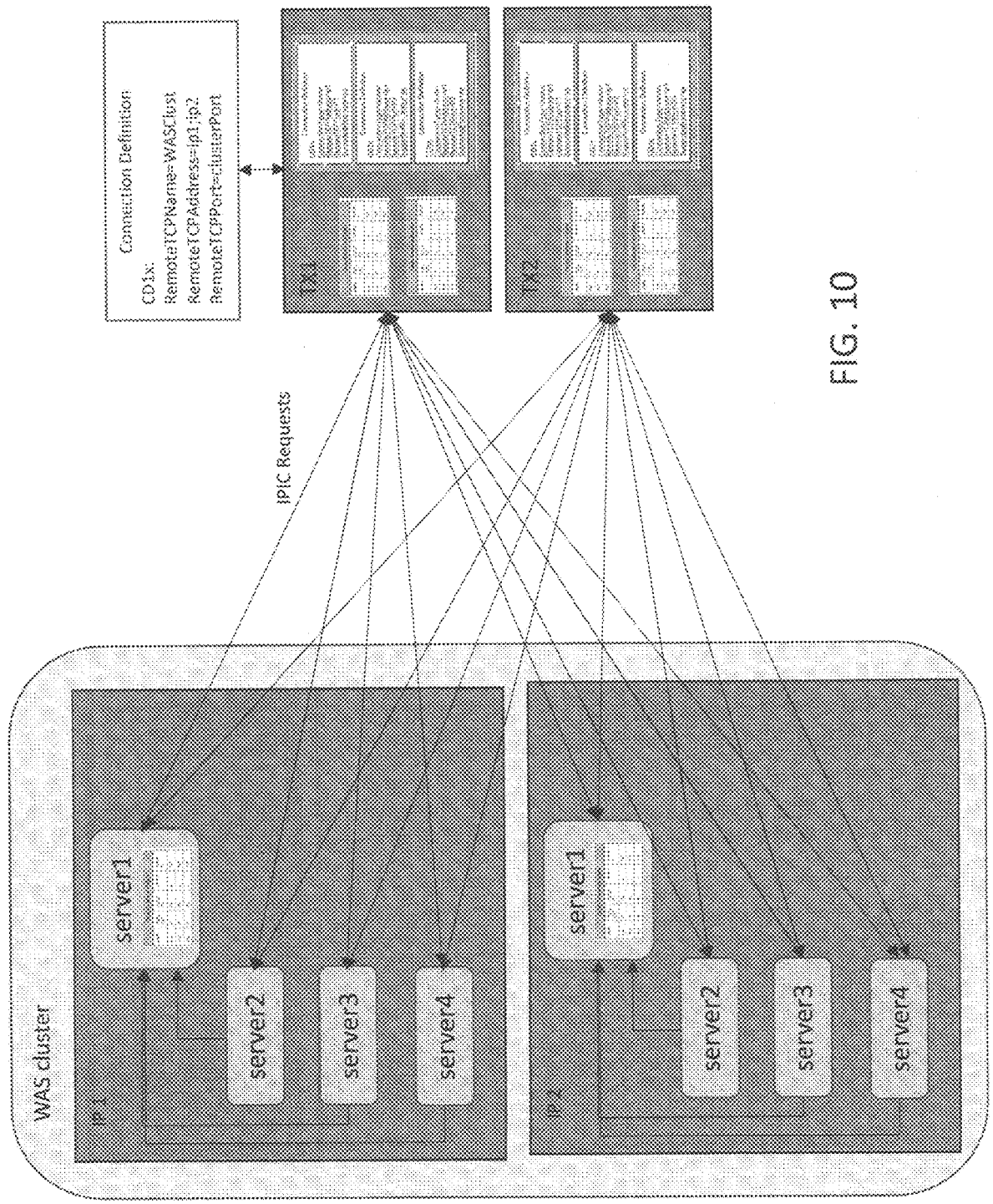
FIG. 10 illustrates a schematic representation of a cluster comprising multiple boxes with respective cluster engines interacting with an EIS after a list of all Connection Definitions are created at runtime according to an embodiment of the present invention.

FIG. 10 illustrates a schematic representation of a cluster comprising multiple boxes with respective cluster engines interacting with an EIS after a list of all Communication Definition (CDs) are created at runtime according to an embodiment of the present invention. After the EIS creates a list of all the Connection Definitions at runtime, the EIS will create connections with the relevant servers. The EIS Algorithm runs as follows: (1) Startup—where the algorithm reads all the Cluster Connection Definition Entries, fetches the Cluster Store for each Cluster, and creates connections corresponding to the cluster CD entries; (2) Regular Polling—where a query is sent to the cluster port, and the CD entries are created and refreshed; (3) Invocation of EJB from EIS—there is a check if EJB corresponds to cluster CD, the system goes through the list of all the CD Entries for the relevant cluster, the next CD entry is selected to route the request; (4) SYNCPOINT—where the EIS maintains the CD entry involved in transaction and, at syncpoint, the EIS sends prepare, commit flows to that CD; and (5) CRASH & RECOVERY—where the EIS is able to maintain the list so that the information about the transaction and the J2EE server in which the server executed persists even after crash.

Recovery and Resync of Resource Adapters on Cluster.

Scenario 1: When 'Worker-clusterThread' Crashes

When a worker-clusterThread crashes, clusterEngine will get to know by heartbeat skipping, which is known to those of skill in the art. The clusterEngine will change the state of that resource adapter to unavailable in the cluster engine store. By way of example, the EIS will identify the failure in 2 scenarios:

a) During regular polling from cluster engine; and b) During an EJB invocation failure.

Enterprise JavaBena (EJB) is one of several JavaAPIs for modular construction of enterprise software, and EJB is a server-side software component that encapsulates business logic of an application. In any case, the EIS will update a list and mark the resource adapter as unavailable. The EIS will abort all the transactions that are in active state on that unavailable resource adapter.

Until the server comes back, the unavailable resource adapter will be marked as unavailable by EIS and no further EJB applications should be routed to it. Once the crashed server comes back, the EIS will read RA_info from logs, which will come up at a new or old ephemeral port based on the availability from OS. The resource adapter will then inform the clusterEngine about RA_info and ephemeral port. As the clusterEngine gets this information, the cluster engine will update the cluster engine store to reflect new port for the respective resource adapter. Next, the EIS will detect that crashed server has come back during regular polling. The EIS will identify new the port, renew the connection and send the recovery data for in-doubt transactions.

Scenario 2: When 'clusterEngine' Crashes

When clusterEngine crashes, one or more servers will identify that the clusterEngine has crashed. The server(s) will enter into same race condition as earlier to become a clusterEngine. One of the resource adapters will successfully become the clusterEngine. All the other resource adapters will have to reset their connections. The EIS will identify the failure during regular polling and the EIS will also refresh the connection. Since a new clusterEngine will still be listening on a same well-known clusterPort, the cluster endpoint will remain same for the EIS and other J2EE servers. Hence the servers can easily refresh the connections. All of the resource adapters may pass on the ephemeral ports to the new cluster engine or, if the new clustering data is stored on a file, the new cluster engine can directly read the file and begin using the stored file.

The cluster engine store will be refreshed by clusterEngine to mark the resource adapter corresponding to old clusterEngine as unavailable. Until the server comes back, the server will be marked as unavailable by the EIS and no further requests will be routed to the server. Once the crashed server comes back, the crashed server can connect to clusterEngine and inform a new ephemeral Port.

Any transactions that were active on that that server will be aborted and the in-doubt transactions will await a decision from the EIS. The EIS will detect that a crashed server has come back online, and the EIS will identify the new port, renew the connection and send the recovery data for prepared transactions.

Figure 11:
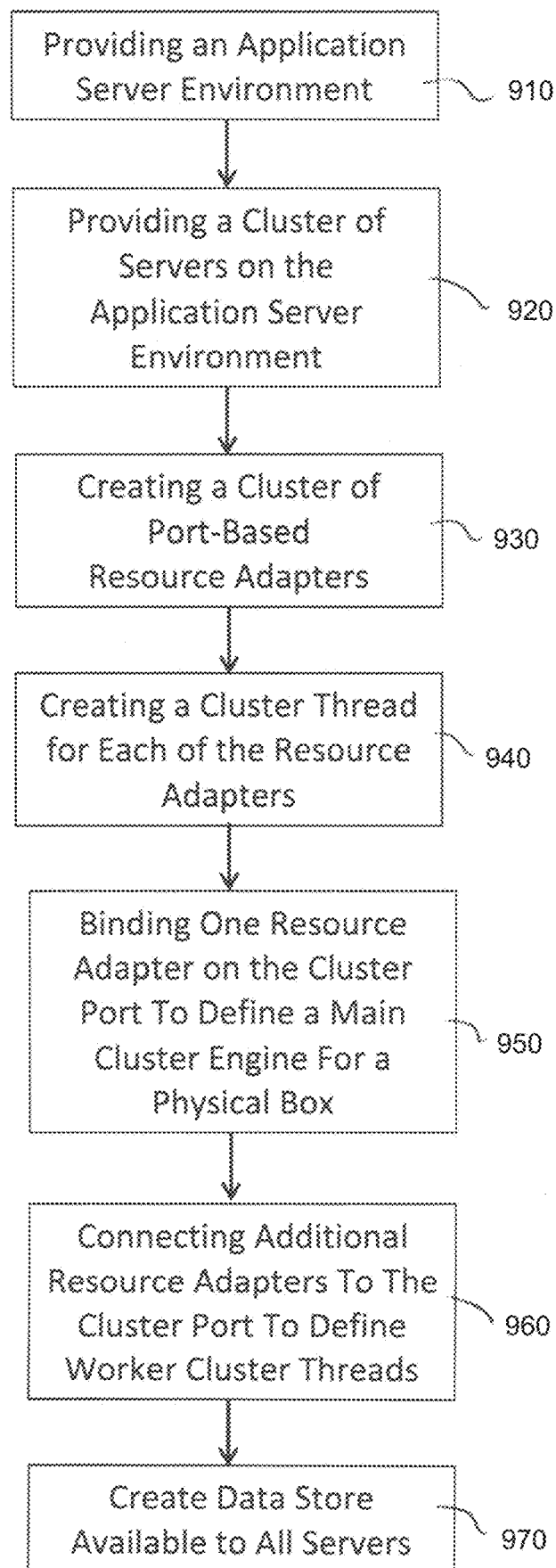
FIG. 11 is a flowchart illustrating steps outlining the method of enabling varying computer applications to function in a Java enterprise computing environment according to one embodiment of the present invention.

FIG. 11 is a flowchart illustrating steps outlining the method of enabling varying computer applications to function in a Java enterprise computing environment according to one embodiment of the present invention. At step 910, the system 100 forms part of an application server environment that, at step 920, defines a cluster of servers on the application server environment. Next, the system creates a cluster of port-based resource adapters at step 930 and creates a cluster thread for each of the resource adapters at step 940 where the cluster thread will read the cluster port from configured properties in J2EE resource adapter custom properties. As described above, each resource adapter will attempt to bind on to the cluster port and only one will bind at step 950. The other resource adapters will then connect to the cluster port through respective cluster threads over the customer protocol to thereby define work cluster threads at step 960. Data is then shared and stored at step 970 in the event of a failure of system crash as described above.

As described above, the present invention uniquely provides the following benefits: requesting a query to get the information of each RA (Resource Adapter) port listed for inbound connections and their respective weights by an EIS; automatically discover the cluster members by an EIS so as to maintain transactionality when cluster members appear on ephemeral ports and to dynamically detect the failure and availability of cluster members.

Based on the foregoing, it is clear that the present invention provides a method and system to automatically discover a cluster member and maintain transactionality when cluster members come on the ephemeral ports. Transaction will be able to span a non Java and J2EE environments.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 12:
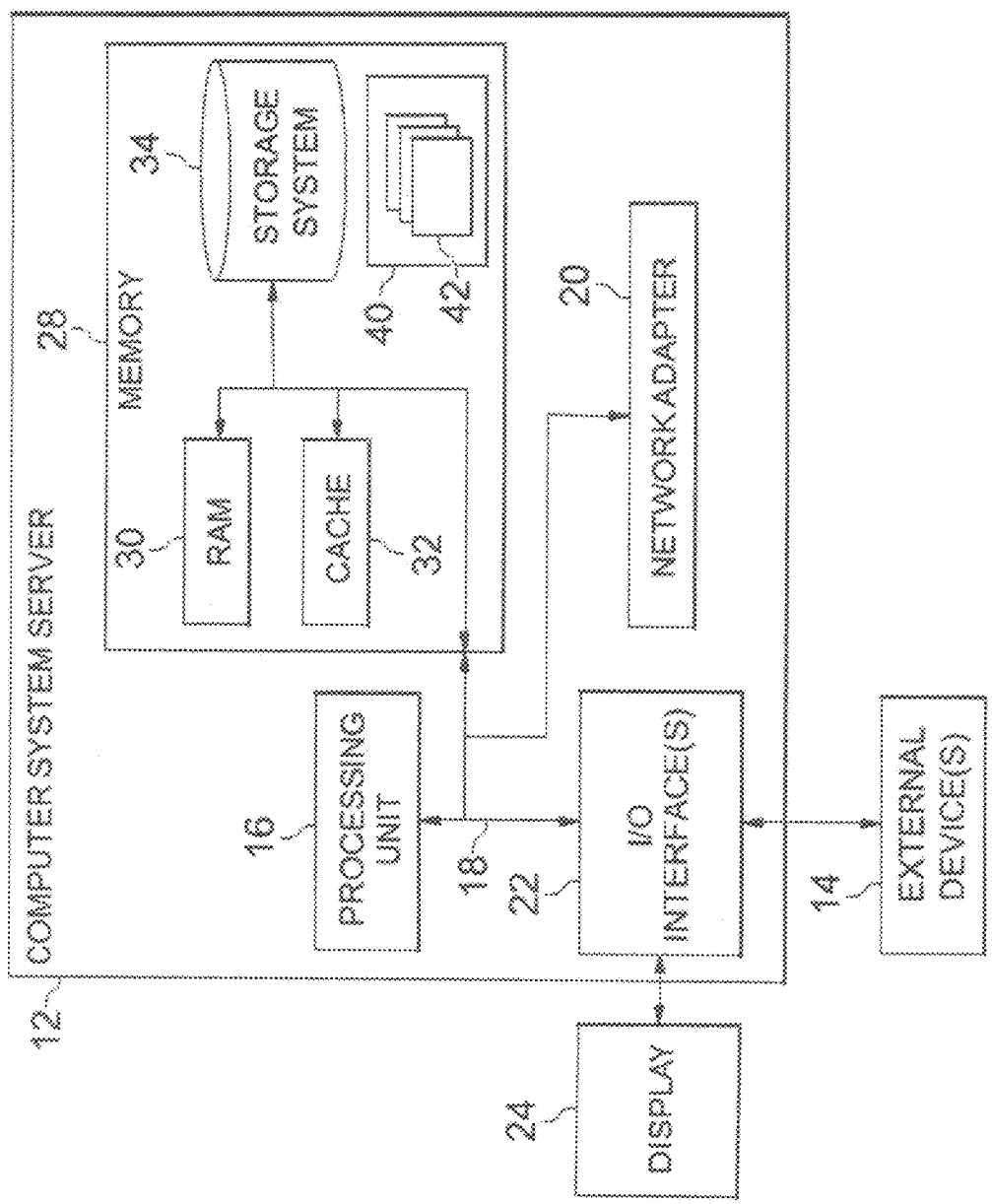
FIG. 12 depicts a cloud computing node according to an embodiment of the present invention.

Referring now to FIG. 12, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 13:
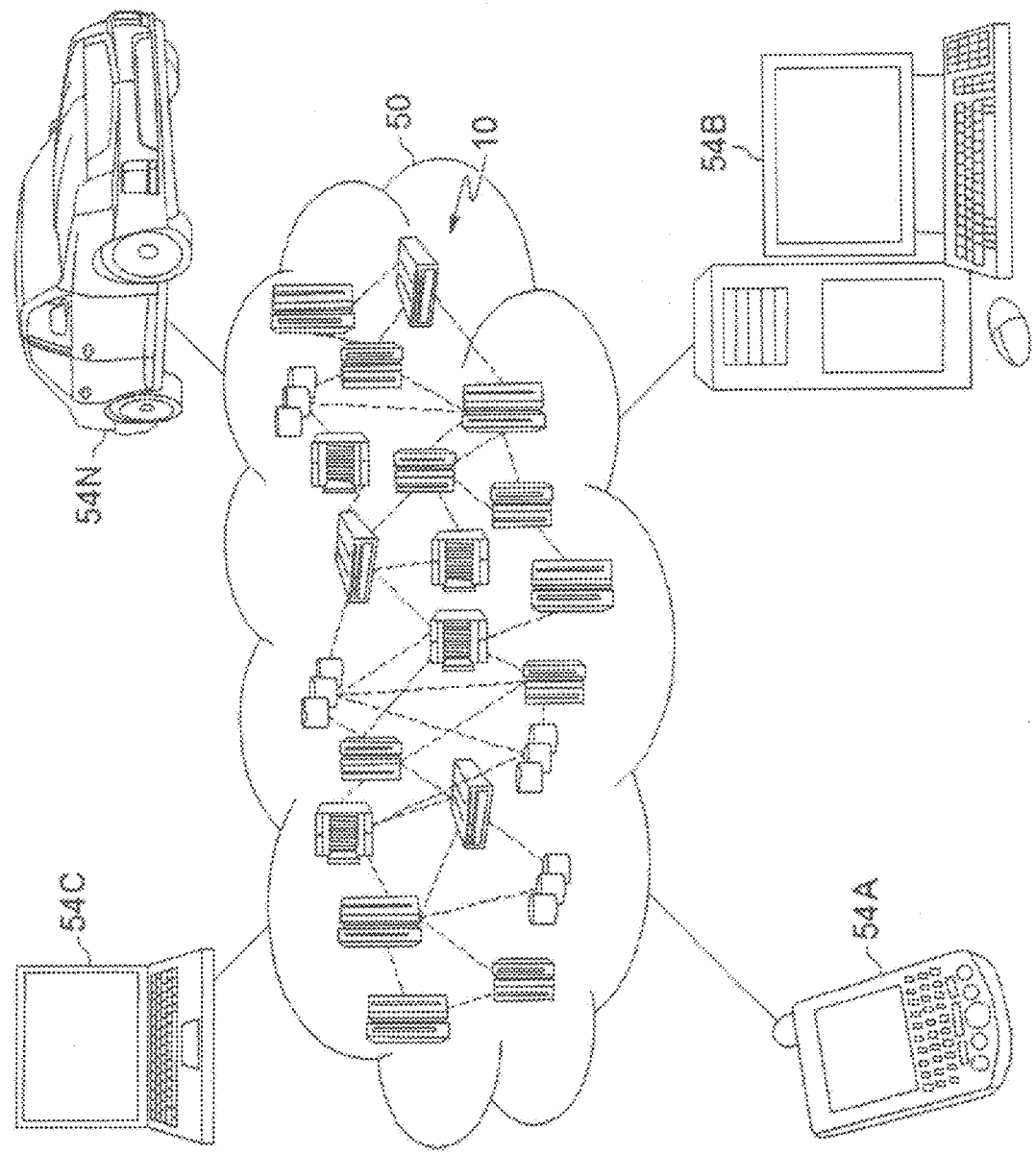
FIG. 13 depicts a cloud computing environment according to an embodiment of the present invention.

Referring now to FIG. 13, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another and may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 14:
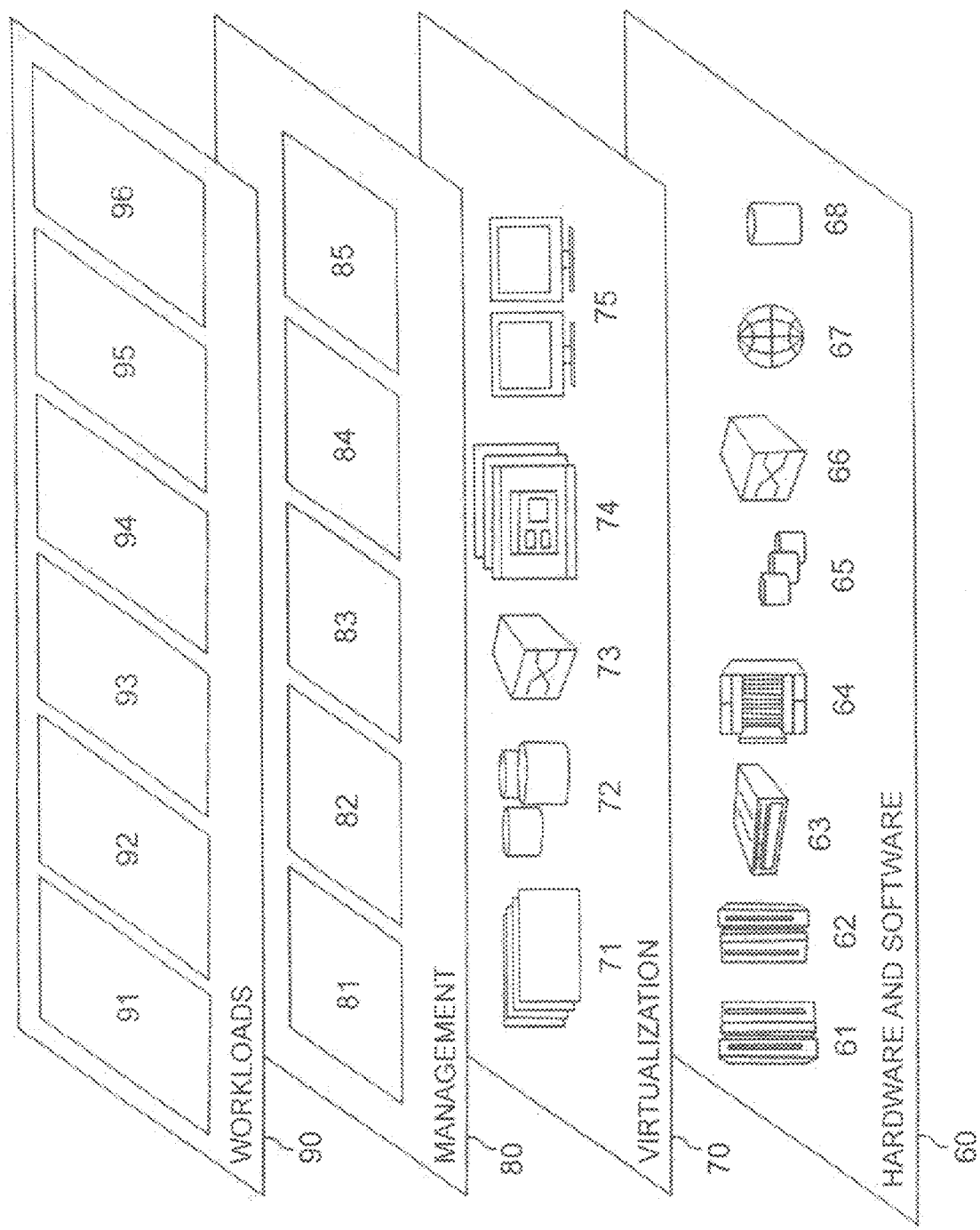
FIG. 14 depicts abstraction model layers according to an embodiment of the present invention.

Referring now to FIG. 14, a set of functional abstraction layers provided by cloud computing environment 50 (FIG. 13) is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the system to enable the present invention 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for enabling varying computer applications that are running in Enterprise Information System to send request to a cluster of Java Enterprise Servers (J2EE server), the method comprising:
   providing, on one or more computers, an application server environment including one or more servers operating within the application server environment to run an application,
   creating, on said one or more computers, a cluster of resource adapters;
   creating, on said one or more computers, a cluster thread for each of said resource adapters to read a cluster port from configured properties,
   wherein said cluster thread for each of said resource adapters enables an enterprise information system to participate in a cluster of J2EE runtime servers while enabling a traditional language online transaction processing (OLTP) platform to participate in a JAVA EE cluster,
   whereby said cluster of resource adaptors provides transaction level interactions via said online transaction processing (OLTP) and whereby transaction states are maintained by both the J2EE runtime servers and the enterprise information system.

2. The method of claim 1, further comprising:
   binding, by said one of more computers, one resource adapter on said cluster port to define a main cluster engine for a physical box, wherein said one resource adapter having said at least one cluster thread communicates on a custom protocol; and
   connecting additional resource adapters to said cluster port through said main cluster engine, said additional resource adapters defining worker cluster threads.

3. The method of claim 2, further comprising:
   utilizing race condition functions of said at least one or more computers to perform a step of binding said one resource adapter on said cluster port, wherein all of said resource adapters will attempt to bind on a single port and an operating system will allow only one of said resource adapters to bind to said cluster port and, due to said race condition functions, only one resource adapter will succeed and other resource adapters will fail to bind.

4. The method of claim 1, wherein said application is an XA-based enterprise information service and said application server environment is a J2EE runtimes server cluster.

5. The method of claim 2, further comprising:
connecting said worker cluster threads to said cluster port over said custom protocol.

6. The method of claim 2, further comprising:
generating, by each of said resource adapters, an inbound listener threads on ephemeral ports, said listener threads publishing port information to said main cluster engine.

7. The method of claim 2, further comprising:
receiving, by said main cluster engine, data from said worker cluster threads; and
creating a data store, said data being available to said servers.

8. The method of claim 2, further comprising:
sending, by the main cluster engine, a unique identifier back to said resource adapters, wherein said resource adapter will store said unique name in a local file associated with said resource adapter.

9. The method of claim 1, further comprising:
generating, by an enterprise information system, a runtime list of all servers participating in the cluster including port information as a connection definition.

10. A computer program product comprising:
a computer-readable storage device; and
a computer-readable program code stored in the computer-readable storage device, the computer readable program code containing instructions executable by a processor of a computer system to perform a method for enabling varying computer applications that are running in Enterprise Information System to send request to a cluster of Java Enterprise Server (J2EE server) cluster, the method comprising:
providing an application server environment including one or more servers operating within the application server environment to run an application,
creating a cluster of resource adapters;
creating a cluster thread for each of said resource adapters to read a cluster port from configured properties,
wherein said cluster thread for each of said resource adapters enables an enterprise information system to participate in a cluster of J2EE runtime servers while enabling a traditional language online transaction processing (OLTP) platform to participate in a JAVA EE cluster,
whereby said cluster of resource adaptors provides transaction level interactions via said online transaction processing (OLTP) and whereby transaction states are maintained by both the J2EE runtime servers and the enterprise information system.

11. The computer program product of claim 10, said method further comprising:
binding one resource adapter on said cluster port to define a main cluster engine for a physical box, wherein said at least one resource adapter having said at least one cluster thread communicates on a custom protocol; and
connecting additional resource adapters to said cluster port through said main cluster engine, said additional resource adapters defining worker cluster threads.

12. The computer program product of claim 11, said method further comprising:
connecting said worker cluster threads to said cluster port over said custom protocol.

13. The computer program product of claim 11, said method further comprising:
generating, by each of said resource adapters, an inbound listener threads on ephemeral ports, said listener threads publishing port information to said main cluster engine.

14. The computer program product of claim 11, said method further comprising:
receiving, by said main cluster engine, data from said worker cluster threads; and
creating a data store, said data being available to said servers.

15. The computer program product of claim 11, said method further comprising:
sending, by the main cluster engine, a unique identifier back to said resource adapters, wherein said resource adapter will store said unique name in a local file associated with said resource adapter.

16. The computer program product of claim 10, said method further comprising:
generating, by an enterprise information system, a runtime list of all servers participating in the cluster including port information as a connection definition.

17. A computer system for enabling varying computer applications that are running an enterprise information system to send request to a cluster of Java Enterprise Servers, the system comprising:
a central processing unit (CPU);
a memory coupled to said CPU; and
a computer readable storage device coupled to the CPU, the storage device containing instructions executable by the CPU via the memory to perform a method for enabling varying computer application that are running in Enterprise Information System to send a request to a cluster of Java Enterprise servers, the method comprising the steps of:
providing an application server environment including one or more servers operating within the application server environment to run an application,
creating a cluster of resource adapters;
creating a cluster thread for each of said resource adapters to read a cluster port from configured properties,
wherein said cluster thread for each of said resource adapters enables an enterprise information system to participate in a cluster of J2EE runtime servers while enabling a traditional language online transaction processing (OLTP) platform to participate in a JAVA EE cluster,
whereby said cluster of resource adaptors provides transaction level interactions via said online transaction processing (OLTP) and whereby transaction states are maintained by both the J2EE runtime servers and the enterprise information system.

18. The computer system of claim 17, said method further comprising:
binding one resource adapter on said cluster port to define a main cluster engine for a physical box, wherein said one resource adapter having said at least one cluster thread communicates on a custom protocol; and
connecting additional resource adapters to said cluster port through said cluster engine, said additional resource adapters defining worker cluster threads.

19. The computer system of claim 18, said method further comprising:
connecting said worker cluster threads to said cluster port over said custom protocol.

20. The computer system of claim 18, said method further comprising:

generating, by each of said resource adapters, an inbound listener threads on ephemeral ports, said listener threads publishing port information to said main cluster engine.

* * * * *